United States Patent
Jung et al.

(10) Patent No.: US 9,264,929 B2
(45) Date of Patent: *Feb. 16, 2016

(54) APPARATUS AND METHOD OF REPORTING LOGGED MEASUREMENTS IN A WIRELESS COMMUNICATION SYSTEM

(75) Inventors: Sung Hoon Jung, Anyang-si (KR); Seung June Yi, Anyang-si (KR); Young Dae Lee, Anyang-si (KR); Sung Duck Chun, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 499 days.

This patent is subject to a terminal disclaimer.

(21) Appl. No.: 13/700,100
(22) PCT Filed: May 26, 2011
(86) PCT No.: PCT/KR2011/003859
§ 371 (c)(1),
(2), (4) Date: Nov. 26, 2012
(87) PCT Pub. No.: WO2011/149281
PCT Pub. Date: Dec. 1, 2011

(65) Prior Publication Data
US 2013/0070632 A1    Mar. 21, 2013

Related U.S. Application Data

(60) Provisional application No. 61/348,710, filed on May 26, 2010, provisional application No. 61/479,835, filed on Apr. 27, 2011.

(51) Int. Cl.
*H04W 24/10* (2009.01)
(52) U.S. Cl.
CPC ..................... *H04W 24/10* (2013.01)

(58) Field of Classification Search
None
See application file for complete search history.

(56) References Cited

U.S. PATENT DOCUMENTS

| 8,233,907 B1 * | 7/2012 | Shah ........................... 455/447 |
| 2005/0042987 A1 | 2/2005 | Lee et al. |

(Continued)

FOREIGN PATENT DOCUMENTS

| CN | 1839652 | 9/2006 |
| CN | 1852078 | 10/2006 |
| WO | 0070897 | 11/2000 |

OTHER PUBLICATIONS

3rd Generation Partnership Project (3GPP), "Technical Specification Group Radio Access Network; Study on Minimization of drive-tests in Next Generation Networks; (Release 9)", 3GPP TR 36.805 V2.0.0, Dec. 2009, 23 pages (relevant sections 4, 5.1, 6, 7.1 and 8).

(Continued)

*Primary Examiner* — Alex Skripnikov
(74) *Attorney, Agent, or Firm* — Lee, Hong, Degerman, Kang & Waimey

(57) ABSTRACT

The present invention provides an apparatus and method of reporting logged measurements in a wireless communication system. User equipment receives an MDT (Minimization of Drive Tests) configuration from a base station, and logs a measurement on the basis of the MDT configuration in order to collect logged measurements. The user equipment determines whether the logged measurement needs to be reported. If it is determined that the logged measurement needs to be reported, the user equipment transmits to the base station a report indicator indicating the need for reporting of the logged measurement.

13 Claims, 9 Drawing Sheets

(56) References Cited

U.S. PATENT DOCUMENTS

2006/0128371 A1* 6/2006 Dillon et al. .................. 455/423
2009/0036116 A1   2/2009 Kim et al.
2011/0201324 A1* 8/2011 Persson et al. ............. 455/422.1
2013/0065535 A1* 3/2013 Zhou et al. ................. 455/67.11

OTHER PUBLICATIONS

3rd Generation Partnership Project (3GPP), "Technical Specification Group Radio Access Network; Study on Minimization of drive-tests in Next Generation Networks; (Release 9)," 3GPP TR 36.805 V2.0.0, Dec. 2009, 23 pages.

LG Electronics Inc., "Indication of MTD log availability," 3GPP TSG-RAN2 Meeting #70, R2-103244, May 2010, 2 pages.

The State Intellectual Property Office of the People's Republic of China Application Serial No. 201180031741.0, Office Action dated Oct. 29, 2014, 5 pages.

3rd Generation Partnership Project (3GPP), "Technical Specification Group Radio Access Network; Study on Minimization of drive-tests in Next Generation Networks (Release 9)," 3GPP TR 36.805 V2.0.0, Dec. 2009, 14 pages.

The State Intellectual Property Office of the People's Republic of China Application Serial No. 201180031741.0, Office Action dated Apr. 7, 2015, 6 pages.

* cited by examiner

APPARATUS AND METHOD OF REPORTING LOGGED MEASUREMENTS IN A WIRELESS COMMUNICATION SYSTEM

CROSS-REFERENCE TO RELATED APPLICATIONS

This application is the National Stage filing under 35 U.S.C. 371 of International Application No. PCT/KR2011/003859, filed on May 26, 2011, which claims the benefit of U.S. Provisional Application Ser. Nos. 61/348,710, filed on May 26, 2010, and 61/479,835, filed on Apr. 27, 2011, the contents of all of which are hereby incorporated by reference herein in their entireties.

TECHNICAL FIELD

The present invention relates to a wireless communication and, more particularly, to a method and an apparatus for reporting logged measurements in a wireless communication system.

BACKGROUND ART

A 3rd generation partnership project (3GPP) long term evolution (LTE) which is improved universal mobile telecommunications system (UMTS) is introduced as 3GPP release 8. The 3GPP LTE uses orthogonal frequency division multiple access (OFDMA) in a lower link and uses single carrier-frequency division multiple access (SC-FDMA) in an upper link. A multiple input multiple output (MIMO) having maximum four antennas is employed. Recently, a discussion on LTE-Advanced (LTE-A) which is evolved 3GPP LTE is being developed.

A minimization of driving tests (MDT) is to test by operators for coverage optimization by using a terminal instead of a vehicle. The coverage is varied according to a location of a base station, an arrangement of neighboring buildings, and a use environment of a user. Therefore, the operator needs to periodically perform a driving test, which consumes a lot of cost and resources. The MDT measures the coverage by the operator using the terminal.

The operator may draft a coverage map indicating availability of a service over an overall service area of the operator and distribution of a quality of the service by summarizing the MDT measurement received from a plurality of terminals, thereby utilizing the coverage map for operating and optimizing the network. For example, when a coverage problem of a particular area is reported from the terminal, the operator may increase transmission power of the base station which provides a service to the corresponding area to expand the coverage of a corresponding area cell.

A result of the MDT measurement is information not needed for the terminal but information used for optimizing the network. Therefore, the terminal may not learn whether the MDT measurement result is important for optimizing the network or for other purpose.

As a result, when the network does not send a command for reporting the logged measurement to the terminal or delays in sending the command, the stored logged measurement may not be reported to the network and may be lost.

DISCLOSURE

Technical Problem

The present invention provides a method and an apparatus for reporting logged measurement in which a terminal informs whether the logged measurement needs to be reported to a network.

Technical Solution

In an aspect, a method for reporting logged measurement in a wireless communication system is provided. The method includes receiving, by a user equipment, a minimization of drive tests (MDT) configuration from a base station, logging, by the user equipment, measurements based on the MDT configuration in order to collect the logged measurement, determining, by the user equipment, whether a reporting of the logged measurements is needed, and transmitting, by the user equipment, a reporting indicator indicating the reporting of the logged measurements is needed to the base station when it is determined that the reporting of the logged measurement is needed.

The user equipment may log the measurements in a radio resource control (RRC) idle mode.

The reporting indicator may indicate that the reporting of the logged measurements is urgent.

The method may further include starting a validity timer upon receiving the MDT configuration and the logged measurement may be logged while the validity timer is running.

The user equipment may determine that the reporting of the logged measurements is needed when a time remaining until the validity timer expires is less than a threshold.

The user equipment may determine that the reporting of the logged measurements is needed when a remaining amount of a buffer which stores the logged measurements is lower than a threshold.

The user equipment may determine that the reporting of the logged measurements is needed when a battery residue is lower than a threshold.

In an another aspect, a wireless apparatus for reporting logged measurement in a wireless communication system is provided. The wireless apparatus includes a radio frequency (RF) unit configured to transmit and receive a radio signal and a processor operably connected to the RF unit. The processor is configured to receive a minimization of drive tests (MDT) configuration from a base station, log measurements based on the MDT configuration in order to collect the logged measurement, determine whether a reporting of the logged measurements is needed, and transmit a reporting indicator indicating the reporting of the logged measurements is needed to the base station when it is determined that the reporting of the logged measurement is needed.

Advantageous Effects

A network may identify urgency or importance of logged measurement and may prevent important logging information from being lost.

MODE FOR INVENTION

Figure 1:
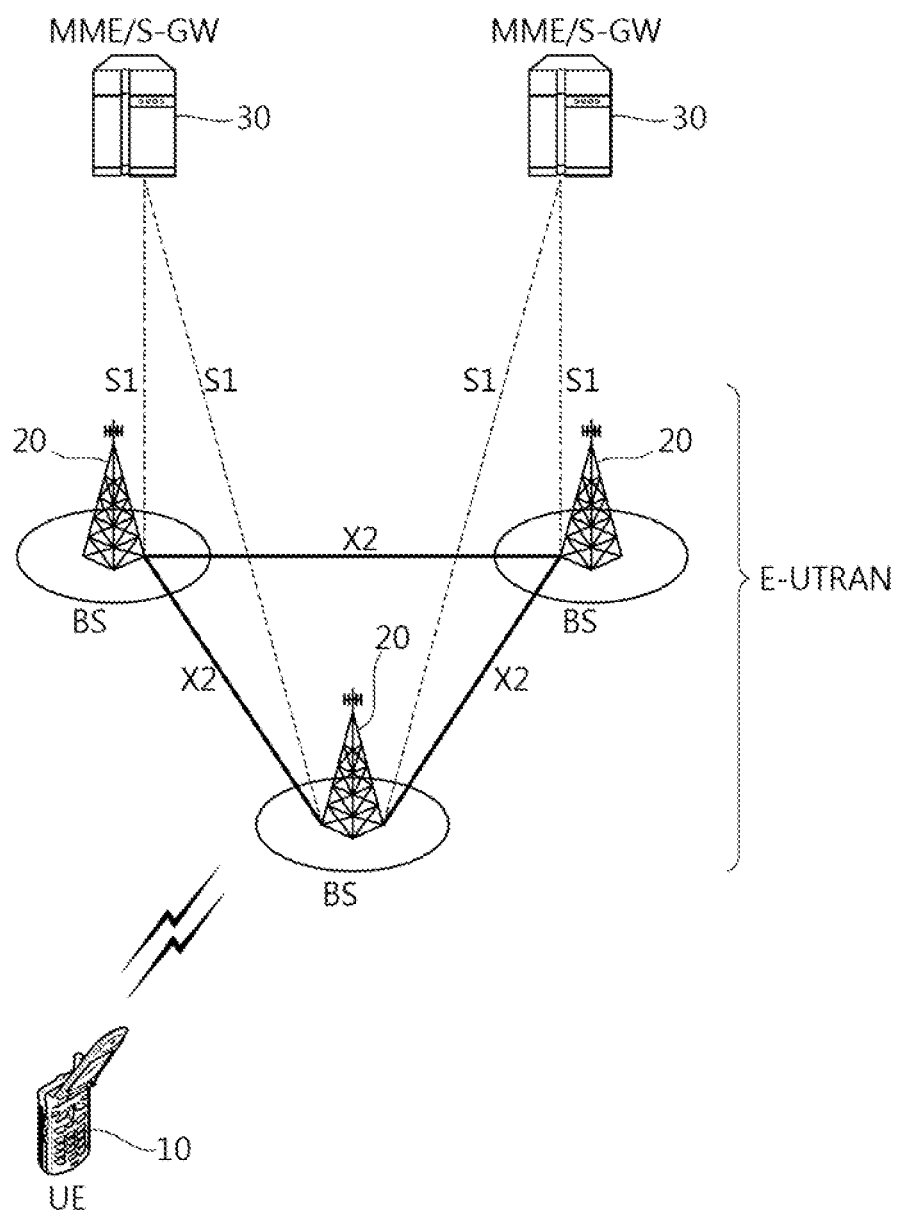
FIG. 1 illustrates a wireless communication system to which the present invention applies.

FIG. 1 illustrates a wireless communication system to which the present invention applies. This may also be called as E-UTRAN (Evolved-UMTS Terrestrial Radio Access Network) or LTE (Long Term Evolution)/LTE-A system.

The E-UTRAN includes a base station (BS) 20 which provides a control plane and a user plane to user equipment (UE) 10. The UE 10 may be fixed or mobile, and may be referred to as a MS (Mobile station), an UT (User Terminal), a SS (Subscriber Station), an MT (Mobile Terminal) and a wireless device. The base station refers to a fixed station which communicates with the UE 10 and may be referred to as another terminology such as an eNB (evolved-NodeB), a BTS (Base Transceiver System), and an access point.

The base station 20 may be connected to each other through an X2 interface. The base station 20 is connected to an EPC (Evolved Packet Core) 30 through the S1 interface, and more particularly, to a S-GW (Serving Gateway) through an S1-MME through an MME (Mobility Management Entity) and S1-U.

The EPC 30 comprises the MME, the S-GW and a P-GW (Packet Data Network Gateway). The MME has information about connection information of a UE or a capacity of the UE, and such information is used primarily for managing mobility of the UE. The S-GW is a gateway having the E-UTRAN as an endpoint thereof, and the P-GW is a gateway having a PDN as an endpoint thereof.

Layers of a radio interface protocol between the UE and the network may be divided into L1 (a first layer), L2 (a second layer) and L3 (a third layer) based on lower three layers of a reference model of an open system interconnection (OSI) well known in a communication system, and a physical layer which belongs to the first layer provides an information transfer service using a physical channel, and a radio resource control (RCC) layer located in the third layer performs a role of controlling a radio resource between the UE and the network. To this end, the RRC layer is used to exchange an RRC message between the UE and the base station.

Figure 2:
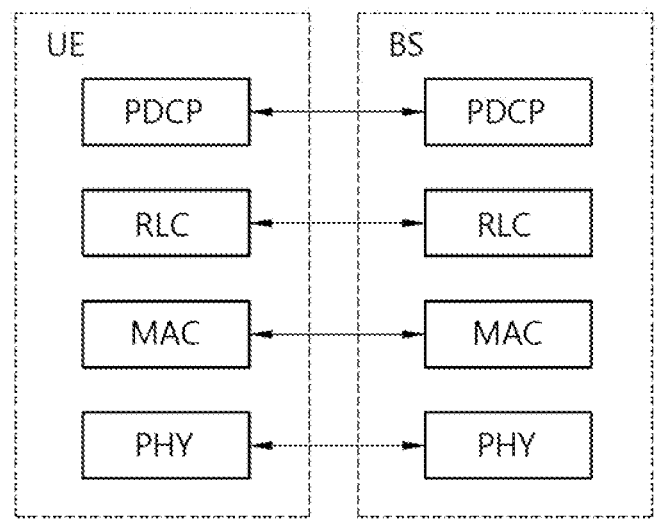
FIG. 2 is a block diagram illustrating a radio protocol architecture with respect to a user plane.
Figure 3:
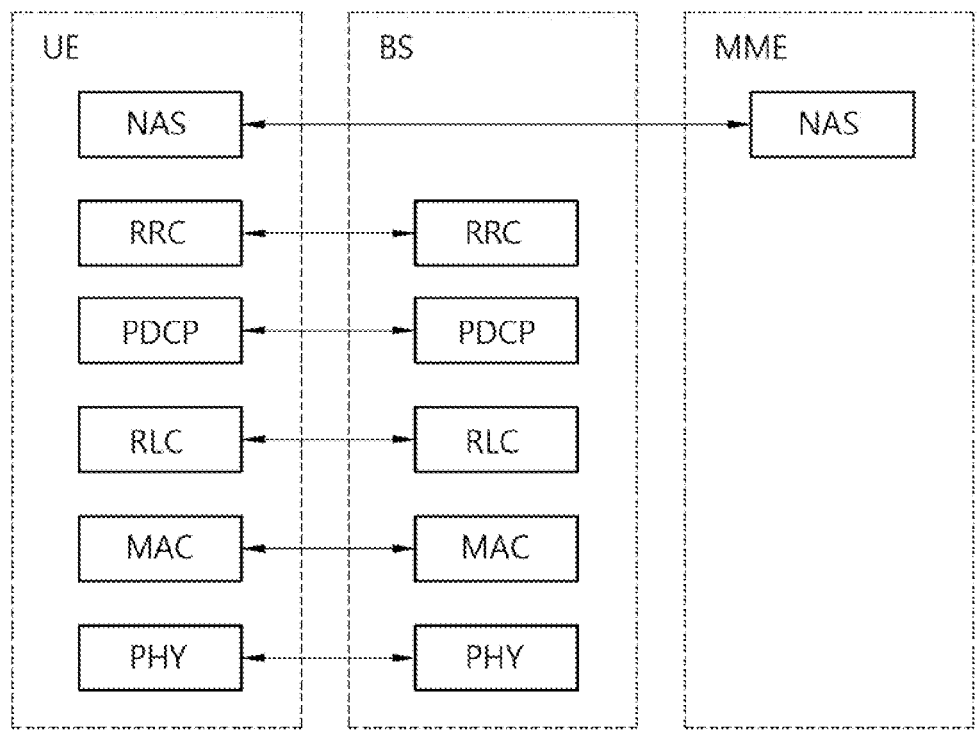
FIG. 3 is a block diagram illustrating a radio protocol architecture with respect to a control plane.

FIG. 2 is a block diagram illustrating a radio protocol architecture with respect to a user plane. FIG. 3 is a block diagram illustrating a radio protocol architecture with respect to a control plane. The data plane is a protocol stack for transmitting a user data, and the control plane is a protocol stack for transmitting a control signal.

Referring to FIGS. 2 and 3, the physical layer (PHY) provides the information transfer service to an upper layer by using the physical channel. The physical channel is connected to an MAC (Medium Access Control) layer, which is an upper layer, through a transport channel. A data is moved between the MAC layer and the physical layer through the transport channel. The transport channel is classified according to how and in which characteristic a data is transmitted through a radio interface.

A data is moved between different physical layers, i.e., between physical layers of a transmitter and a receiver. The physical channel may be modulated in OFDM (Orthogonal Frequency Division Multiplexing) method, while utilizing a time and a frequency as the radio resource.

A function of the MAC layer includes mapping between a logic channel and the transport channel and multiplexing/demultiplexing to a transport block provided as the physical channel on the transport channel of an MAC SDU (service data unit) which belongs to the logic channel. The MAC layer provides a service to a radio lank control (RLC) layer through the logic channel.

A function of the RLC layer includes concatenation, segmentation, and reassembly of an RLC SDU. To ensure various QoS (Quality of Service) required by a radio bearer (RB), the RLC layer provides three operation modes such as a transparent mode (TM), an unacknowledged mode (UM), and an acknowledged mode (AM). An AM RLC provides error correction through ARQ (automatic repeat request).

A function of a PDCP (Packet Data Convergence Protocol) layer in the user plane includes delivery of the user data, header compression, and ciphering. The function of the PDCP layer in the user plane includes delivery of a control plane data and ciphering/integrity protection.

The RRC (Radio Resource Control) layer is defined only in the control plane. The RRC layer is responsible for controlling the logic channel, the transport channel, and the physical channels in association with configuration, re-configuration, and release of the radio bearers. The PB means a logical path provided by the first layer (PHY layer) and the second layer (the MAC layer, the RLC layer, the PDCP layer) for data transmission between the UE and the network.

Setting of the PB means a process of defining a characteristic of the radio protocol layer and the channel in order to provide a specific service and a process of setting respective specific parameters thereof and an operation method. The RB may be again divided into two of SRB (Signaling RB) and DRB (Data RB). The SRB is used as a path for transmitting the RRC message in the control plane and the DRB is used as a path for transmitting the user data in the user plane.

When an RRC connection is established between the RRC layer of the UE and the RRC layer of the E-UTRAN, the UE is in an RRC connection state, and when the RRC connection is not established, the UE is in an RRC idle state.

A downlink transmission channel for transmitting a data from the network to the UE includes BCH (Broadcast Channel) for transmitting system information and a downlink SCH (Shared Channel) for transmitting user traffic or a control message. A downlink multicast or a traffic of a broadcast service or the control message may be transmitted through the downlink SCH or through a separate downlink MCH (Multicast Channel). On the other hand, an uplink transmission transmit for transmitting a data from the UE to the network may include an RACH (Random Access Channel) for transmitting an initial control message and an uplink SCH (Shared Channel) for transmitting the user traffic or the control message.

The logical channel located above the transmission channel and mapped to the transport channel includes BCCH (Broadcast Control Channel), PCCH (Paging Control Channel), CCCH (Common Control Channel), MCCH (Multicast Control Channel), MTCH (Multicast Traffic Channel), etc.

The physical channel consists of multiple OFDM symbols in time domain and multiple sub-carriers in frequency domain. One sub-frame consists of a plurality of OFDM symbols in the time domain. A resource block is a resource allocation unit and consists of a plurality of OFDM symbols and a plurality of sub-carriers. In addition, each sub-frame may use PDCCH (Physical Downlink Control Channel), i.e., specific OFDM symbol (for example, a first OFDM symbol) of a corresponding sub-frame for an L1/L2 control channel. TTI (Transmission Time Interval) is a unit interval of transmitting the sub-frame.

Hereinafter, an RRC state and an RRC connection method of the UE will be described.

The RRC state indicates whether the RRC layer of the UE has a logical connection with the RRC layer of the E-UTRAN, and if the two are connected, the RRC state is referred to as the RRC connection state, and if the two are not connected, referred to as the RRC idle state. Since the UE in the RRC connection state has the RRC connection, the E-UTRAN may identify an existence of a corresponding UE in unit of a cell, and therefore, the UE may be effectively controlled. On the other hand, the UE in the RRC idle state may not be identified by the E-UTRAN and managed by a CN (core network) in unit of a tracking area, which is larger than the cell. In other words, the UE in the RRC idle state may be identified only about the existence thereof in unit of a large area and the UE needs to move to the RRC connection state in order to receive a common mobile communication service such as a voice or a data.

When a user first turns on a power of the UE, the UE first navigates an appropriate cell and stays in the RRC idle state. The UE in the RRC idle state establishes the RRC connection with the E-UTRAN through an RRC connection procedure only when there is a need for establishing the RRC connection and transitions to the RRC connection state. Various cases exists where the UE in the RRC idle state needs to establish the RRC connection, e.g., uplink data transmission is necessary for a reason of, for example, the user's call attempt, or a paging message is received from the E-UTRAN and a response message is transmitted in response thereto.

An NAS (Non-Access Stratum) layer located in an upper RRC layer performs session management and mobility management.

In order to manage the mobility of the UE, two states of EMM-REGISTERED (EPS Mobility Management-REGISTERED) and EMM-DEREGISTERED are defined, and the two states apply to the UE and the MME. Initially, the UE is in the EMM-DEREGISTERED state, and in order for the UE to connect to the network, a process of registering to a corresponding network is performed through an initial attach procedure. When the attach procedure is successfully performed, the UE and the MME are in the EMM-REGISTERED state.

To manage a signaling connection between the UE and the EPC, two states of an ECM (EPS Connection Management)-IDLE state and an ECM-CONNECTED state are defined, and the two states are applied to the UE and the MME. When the UE in the ECM-IDLE has RRC connection with the E-UTRAN, a corresponding UE is in the ECM-CONNECTED state. When the MME in the ECM-IDLE state has an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a mobility related procedure based on the UE such as cell selection or cell re-selection without a need for receiving a command from the network. On the other hand, when the UE is in the ECM-CONNECTED state, the mobility of the UE is managed by the command from the network. When a location of the UE in the ECM-IDLE state is different from a location known by the network, the UE notifies a corresponding location of the UE to the network through a tracking area updating procedure.

Next, system information is described.

The system information includes essential information which must be known in order for the UE to connect to the base station. Therefore, the UE must receive all the system information before the UE is connected to the base station system, and also the UE needs to have the most recent system information. Since the system information is the information which must be known by all UEs within a cell, the base station periodically transmits the system information.

According to Section 5.2.2 of 3GPP TS 36.331 V8.7.0 (2009-09) "Radio Resource Control (RRC) Protocol specification (Release 8)," the system information is divided into MIB (Master Information Block), SB (Scheduling Block) and SIB (System Information Block). The MIB enables the UE to be aware of a physical configuration of a corresponding cell, for example, a bandwidth. The SB informs transmission information of the SIBs, for example, a transmission period. The SIB is a collection of system information that are related to one another. For example, a certain SIB includes information only about a surrounding cell and a certain SIB includes information only about an uplink radio channel used by the UE.

Generally, a service provided by the network to the UE can be divided into three types as below. In addition, the UE recognizes a cell type depending on which service is available. A service type is first described below and the cell type is described later.

1) Limited service: This service provides an emergency call and a disaster warning system (Earthquake and Tsunami Warning System; ETWS) and may be provided in an acceptable cell.

2) Normal service: This service means a public use service of a general purpose and may be provided in a suitable or normal cell.

3) Operator service: This service means a service for a communication network operator, and this cell can be used only by the network operator, not by a general user.

Regarding the service type provided by the cell, the cell type may be classified as follows.

1) Acceptable cell: a cell in which the UE may be provided with a limited service. The cell is not barred and satisfies a cell selection criteria.

2) Suitable cell: a cell in which the UE may be provided with a regular service. This cell satisfies a condition for the acceptable cell while satisfying additional conditions at the same time. The additional conditions are that this cell must belong to a PLMN to which a corresponding UE can connect and must be a cell in which performing the tracking area updating procedure of the UE is not prohibited. If the corresponding cell is a CSG cell, this cell must be a cell to which the UE can connect to as a CSG member.

3) Barred cell: a cell which broadcasts information that the cell is barred through the system information 4) Reserved cell: a cell which broadcasts information that the cell is reserved through the system information.

Hereinafter, measurement and measurement reporting are described.

Support for the mobility of the UE is essential in a mobile communication system. Therefore, the UE continuously measures a quality of a serving cell which currently provides a service and a quality of a surrounding cell. The UE reports the measurement result to the network at an appropriate time, and the network provides an optimal mobility to the UE through, e.g., a handover.

In order to provide information which can assist the operator in operating the network, other than a purpose for supporting the mobility, the UE may perform measurement for a specific purpose set by the network and report the measurement result to the network. For example, the UE receives broadcast information of a specific cell set by the network. The UE may report a cell identity (referred to as a global cell identity) of the specific cell, identification information of a location to which the specific cell belongs (e.g., a tracking area code), and/or other cell information (e.g., membership of the CSG (Closed Subscriber Group) cell) to the serving cell.

When it is identified that a quality of the UE in motion in a specific area is very poor based on the measurement, the location information of cells having a poor quality and the measurement result may be reported to the network. The network may seek to optimize the network based on the reporting of the measurement result of UEs which assist the operation of the network.

In a mobile communication system of which frequency reuse factor is 1, a communication is performed between different cells in a frequency band having similar mobility in most part. Therefore, in order to sufficiently secure the mobility of the UE, the UE needs to be capable of measuring a quality of surrounding cells having the same center frequency as a center frequency of the serving cell and cell information thereof. Thus, measurement of a cell having the same center frequency as the center frequency of the serving cell is called an intra-frequency measurement. The UE performs the intra-frequency measurement and reports the measurement result to the network at an appropriate time to achieve an objective of a corresponding measurement result.

The mobile communication operator may operate the network by using a plurality of frequency bands. In a case where a service of the communication system is provided through the plurality of the frequency bands, in order to secure optimal mobility of the UE, the UE needs to be capable of measuring a quality of surrounding cells having a center frequency different from a center frequency of the serving cell and cell information thereof. Thus, measurement of a cell having the center frequency different from the center frequency of the serving cell is called an inter-frequency measurement. The UE needs to perform the inter-frequency measurement and report the measurement result to the network at an appropriate time.

When the UE supports the heterogeneous network, a measurement of a cell in the heterogeneous network may be performed by a setting of the base station. Such measurement on the heterogeneous network is called an inter-RAT (Radio Access Technology) measurement. For example, the RAT may include UTRAN (UMTS Terrestrial Radio Access Network) and GERAN (GSM EDGE Radio Access Network) which are compliant to a 3GPP standard and may also include a CDMA 2000 system which is compliant to a 3GPP2 standard.

Figure 4:
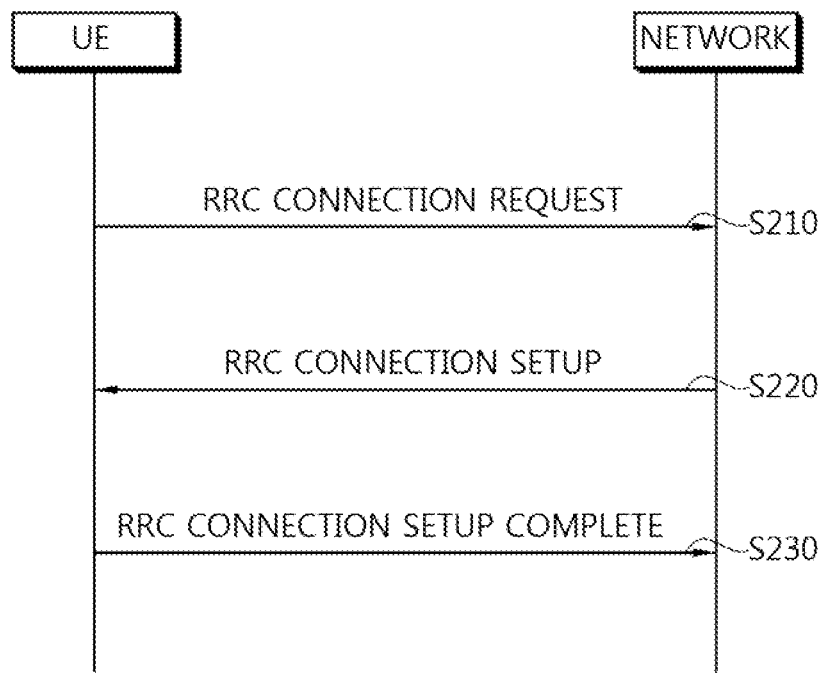
FIG. 4 is a flow chart illustrating a process of establishing a radio resource control (RRC) connection.

FIG. 4 is a flow chart illustrating a process of establishing a RRC connection.

A UE sends an RRC connection request message requesting an RRC connection to the network (S210). The network sends an RRC connection setup message in response to the RRC connection request (S220). Upon receiving the RC connection setup message, the UE enters into an RRC connection mode.

The UE sends an RRC connection setup complete message which is used to verify successful completion of establishing the RRC connection to the network (S230).

An RRC connection re-establishment is performed similarly to an RRC connection establishment. The RRC connection re-establishment is to re-establish the RRC connection, and is related to re-starting an SRB1 operation, re-activating security, and setting a primary cell (PCell). The UE sends an RRC connection re-establishment request message requesting re-establishment of the RRC connection to the network. The network sends an RRC connection re-establishment message in response to the RRC connection re-establishment request. The UE sends an RRC connection re-establishment complete message in response to the RRC connection re-establishment.

Figure 5:
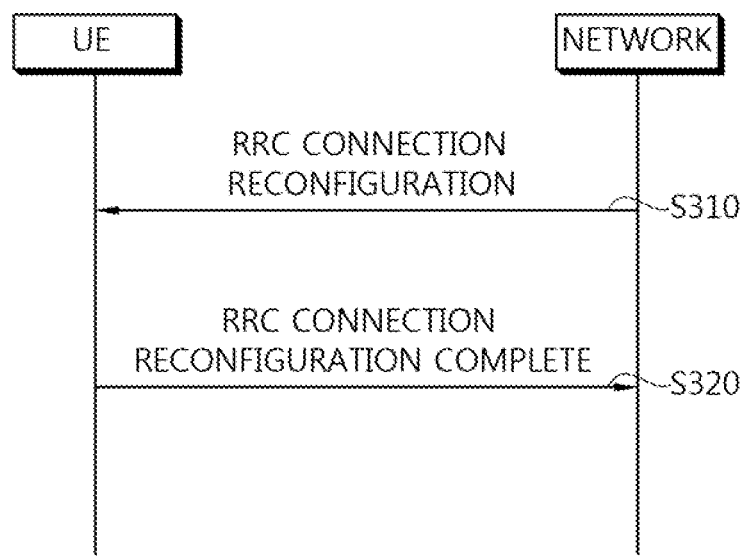
FIG. 5 is a flow chart illustrating a process of re-establishing an RRC connection.

FIG. 5 is a flow chart illustrating a process of re-configuring an RRC connection. The RRC connection reconfiguration is used to modify the RRC connection. The RRC reconfiguration is used to establish/modify/release the RB, perform a handover, and setup/modify/release measurement.

The network sends an RRC connection reconfiguration message to the UE to modify the RRC connection (S310). The UE sends an RRC connection reconfiguration complete message to the network in order to verify a successful completion of the RRC connection reconfiguration in response to the RRC connection reconfiguration (S320).

Figure 6:
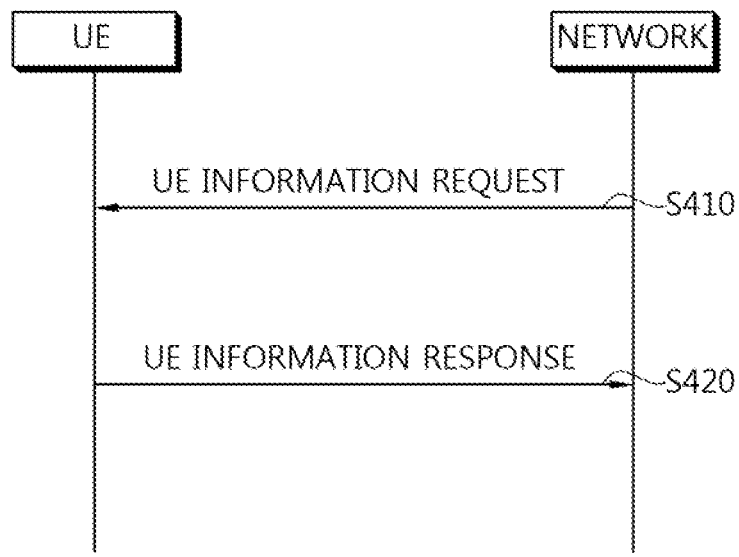
FIG. 6 is a flow chart illustrating a process of reporting UE information.

FIG. 6 is a flow chart illustrating a process of reporting UE information.

A network sends an UE information request message to the UE in order to obtain the UE information (S410). The UE information request message includes a field indicating whether the UE reports information about a random access process and/or a radio link failure. The UE information request message includes a field indicating whether the UE reports the logged measurement.

The UE sends an UE information response message including information requested by the UE information request to the network (S420).

Here, the minimization of driving tests (MDT) is described.

The MDT is to test by operators for coverage optimization by using a UE instead of a vehicle. The coverage is varied according to a location of a base station, an arrangement of a neighboring building, and a use environment of a user. Therefore, the operator needs to periodically perform a driving test, which consumes a lot of cost and resources. The MDT measures the coverage by the operator using the UE.

The MDT may be divided into a logged MDT and an immediate MDT. According to the logged MDT, the UE performs the MDT measurement and transmits the logged measurement to the network at a particular time point. According to the immediate MDT, the UE performs the MDT measurement and transmits the measurement to the network when a reporting condition is satisfied. The logged MDT performs the MDT measurement in the RRC idle mode, wherein the immediate MDT performs the MDT measurement in the RRC connection mode.

Figure 7:
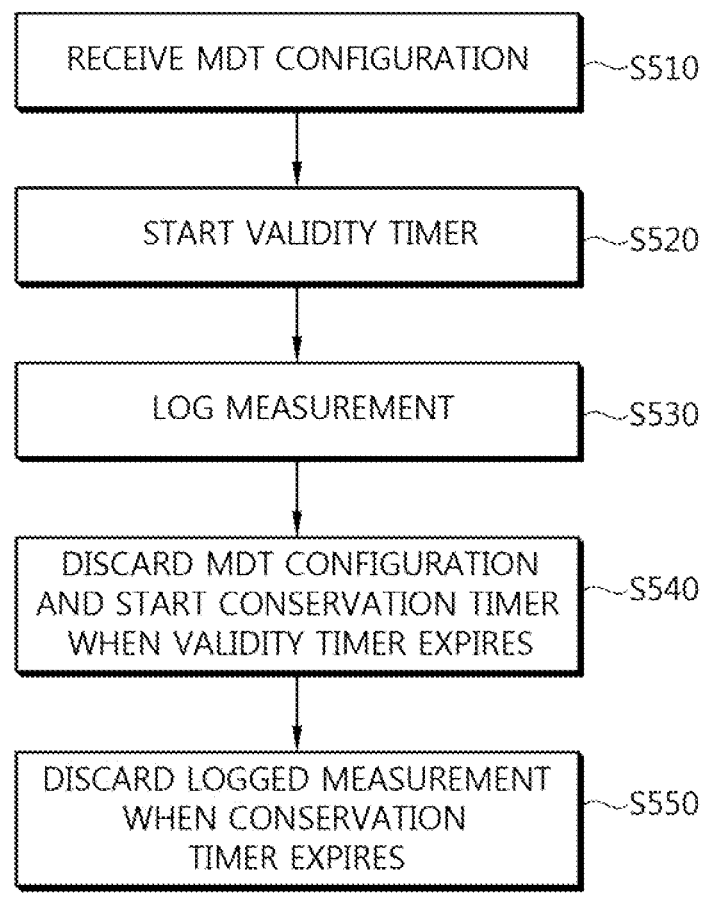
FIG. 7 illustrates a process of performing a conventional minimization of driving tests (MDT)

FIG. 7 illustrates a process of performing a conventional minimization of driving tests (MDT).

A UE receives a MDT configuration from the network (S510). The UE is in the RRC connection mode in which the RRC connection with the serving cell is established. Even when the RRC mode transits to the RRC idle mode, the MDT configuration is maintained, and accordingly, the MDT measurement result is also maintained.

The MDT configuration may include at least one of a logging interval, a reference time and an area configuration.

The logging interval indicates a period for storing the measurement result. The reference time is used to indicate a reference time used when the UE transmits the logged measurement. The area configuration indicates an area in which the UE is requested to perform the logging.

Upon receiving the MDT configuration, the UE starts a validity timer (S520). The validity timer indicates a lifetime of the MDT configuration. A value of the validity timer may be included in the MDT configuration. Such value is called a logging duration. When the UE receives the MDT configuration, the UE sets the value of the validity timer as the logging duration and starts the validity timer.

The UE switches to the RRC idle mode and then logs the measurement based on the MDT configuration during when the validity timer is operated (S530). For example, the MDT measurement is performed every logging period within the MDT configuration. The MDT measurement value may be a value well known to a person of ordinary skill in the art such as RSRP (Reference Signal Received Power), RSRQ (Reference Signal Received Quality), RSCP (received signal code power), Ec/No.

When the validity timer expires, the UE discards the MDT configuration and starts a conservation timer (S540). The UE discards the MDT configuration and stops the MDT measurement. However, the logged measurement is maintained. The conservation timer indicates a lifetime of the logged measurement.

When the conservation timer expires, the logged measurement is discarded (S550). When a reporting request of the logged measurement is received from the base station during when the conservation timer is operated, the UE may report the logged measurement.

A value of the conservation timer may be fixed. For example, the value of the conservation timer may be 48 hours. Alternatively, the value of the conservation timer may be included in the MDT configuration such that the base station may notify the value to the UE.

When a new MDT configuration is received, the MDT configuration is updated to a new MDT configuration and the validity timer is restarted. Also, the MDT measurement previously logged according to the previous MDT configuration is discarded.

When there are the logged MDT measurements, the UE may send an availability of the logged measurement to the base station when the UE switches from the RRC idle mode to the RRC connection mode. The UE may send the availability of the logged measurement to the network when the RRC connection is established, re-established, or re-configured.

The network which receives that the logged MDT measurement exists from the UE may request the UE to transmit the logged MDT measurement. The network which learns about the logged measurement transmits an information request for requesting the reporting of the logged measurement to the UE. The UE transmits an information response including the logged measurement to the network.

A content measured by the UE during when the MDT measurement is performed is primarily related to a wireless environment. The MDT measurement may include a cell identifier, a signal quality of a cell and/or a signal strength. The MDT measurement may include a measurement time and a measurement location.

According to the conventional MDT, the UE notifies the network only about availability of the logged measurement. The network may acknowledge only whether there are the logged measurements. The network may not acknowledge whether the logged measurement is important information for optimizing the network or for other purposes. For example, when the logged measurement is about to be deleted, the network may not learn about such event. As a result, when the network does not send a command for reporting the logged measurement to the UE or delays in sending the command, the stored logged measurement may not be reported to the network and lost.

In the suggested present invention, when the UE stores the logged measurement that is not transmitted to the network and the logged measurement stored in the UE is important or transmission thereof is urgent, the UE notifies the network of this so that the network may promptly retrieve the logged measurement.

Figure 8:
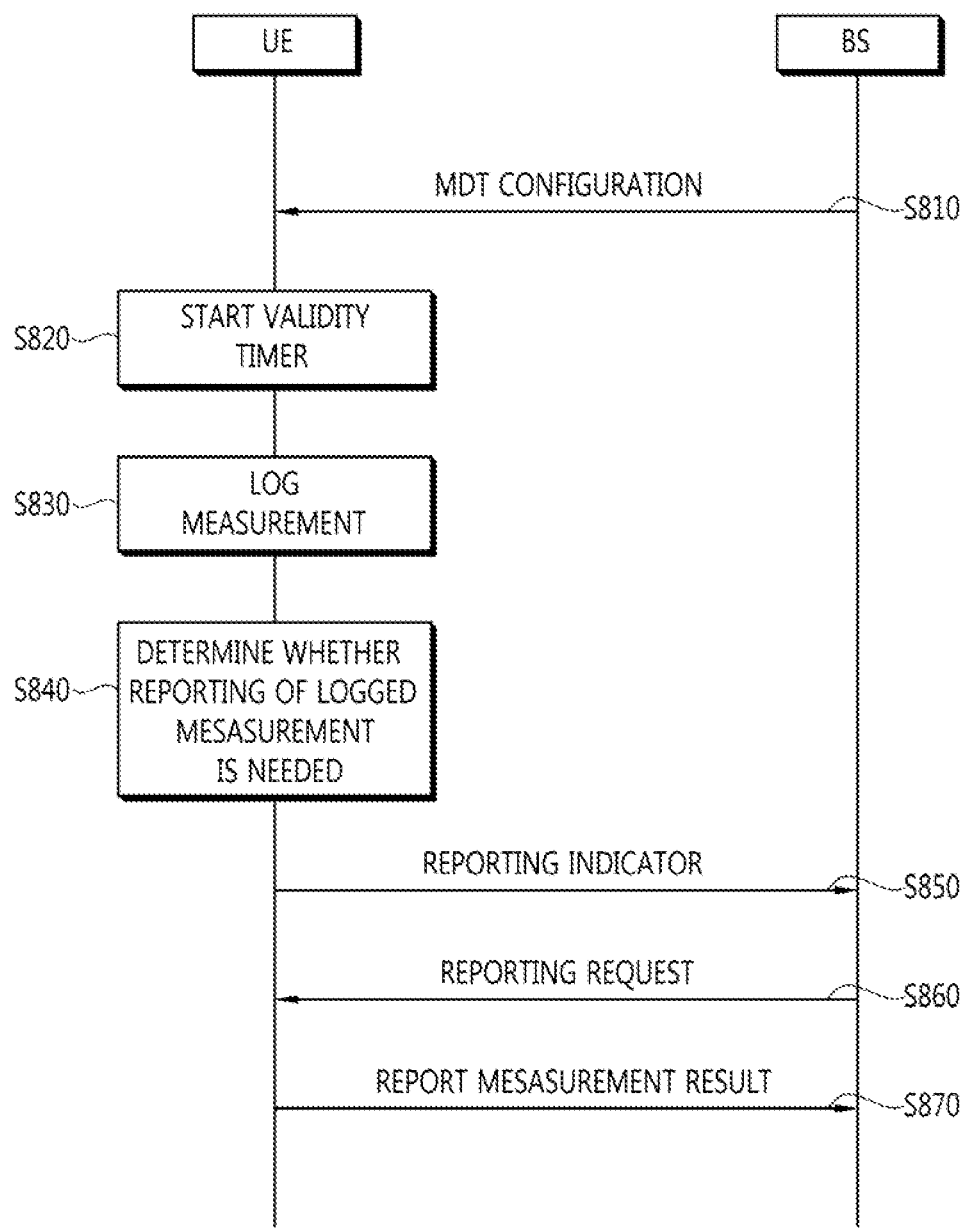
FIG. 8 is a flow chart illustrating a method of reporting logged information according to an exemplary embodiment of the present invention.

FIG. 8 is a flow chart illustrating a method of reporting logged information according to an exemplary embodiment of the present invention.

An UE receives an MDT configuration from a base station (S810). The UE receives the measurement configuration for MDT measurement in an RRC connection mode in which an RRC connection with a serving cell is established.

The MDT configuration may include at least one of a logging interval, a reference time, and an area setting. Also, the MDT configuration may include information about an event in which the MDT measurement is performed. When the event is generated, the MDT measurement is performed.

Upon receiving the MDT configuration, the UE starts a validity timer (S820). The validity timer indicates a lifetime of the MDT configuration. A value of the validity timer may be included in the MDT configuration. Such value is called a logging duration. When the UE receives the MDT configuration, the UE sets the value of the validity timer as the logging duration and starts the validity timer.

The UE switches to an RRC idle mode and then logs the measurement based on the MDT configuration while the validity timer is running (S830).

The UE determines whether reporting of the logged measurement is needed (S840). When it is determined that transmission of the logged measurement is urgent, the UE may determine that the reporting of the logged measurement is needed. A criterion for determining whether the reporting of the logged measurement is needed will be described later.

When the reporting of the logged measurement is needed, the UE sends a reporting indicator to the base station (S850). The reporting indicator may notify the base station about a reason why the reporting of the logged measurement is needed.

The reporting indicator may be transmitted through a measurement reporting message or a UE information response message. Alternatively, the UE may send the reporting indicator to the network when the RRC connection is established, the RRC connection is re-established, or when the RRC connection is re-configured. For example, when the RRC connection of FIG. 5 is performed, the reporting indicator may be included in an RRC connection setup complete message. When a process of re-configuring the RRC connection of FIG. 6 is performed, the reporting indicator may be included in an RRC connection re-configuration complete message.

When it is determined that transmission of a measurement result is urgent, the UE in the RRC idle mode may attempt to switch to the RRC connection mode. In the RRC connection mode, the reporting indicator may be transmitted.

The base station which learns the urgency or importance of the logged measurement based on the reporting indicator may send a reporting request requesting the reporting of the logged measurement to the UE (S860). The UE reports the measurement result including the logged measurement to the base station (S870).

A criterion for determining, by the UE, whether the reporting of the logged measurement is needed is now described.

The UE may determine that the reporting of the logged measurement is needed when the transmission of the logged measurement is urgent. An urgency of the reporting of the logged measurement may be determined according to the following criteria.

(1) Validity Timer

When a time remaining until the validity timer expires is less than a threshold value, the UE may determine that the transmission of the logged measurement is urgent.

(2) Conservation Timer

When the conservation timer starts or a time remaining until the conservation timer expires is less than a threshold value, the UE may determine that the transmission of the logged measurement is urgent. It is be because the logged measurement is discarded when the conservation timer expires.

Also, the UE may notify the base station about existence of the logged measurement after the conservation timer expires and before discarding the logged measurement.

(3) Buffer for Storing the Logged Measurement

When a buffer for storing the logged measurement is full or a remaining buffer amount is lower than a threshold value, the UE may determine that the transmission of the logged measurement is urgent.

(4) Change of RRC Connection

When the UE switches from the RRC connection mode into the RRC idle mode or vice versa, the UE may determine that the transmission of the logged measurement is urgent. It is because the logged measurement may be set to be deleted when the UE switches from the RRC connection mode into the RRC idle mode.

(5) Battery of the UE

When a battery residue is lower than a threshold value, the UE may determine that the transmission of the logged measurement is urgent. When the battery residue is deficient, it is preferable that the UE minimizes an operation thereof other than a core operation for the service provided to a user.

When the battery residue is lower than the threshold value, the UE may notify this to the network and discard the measurement setting and the logged measurement after a predetermined time period elapses.

(6) User Setting

When a user changes a setting related to the MDT configuration, the UE may determine that the transmission of the logged measurement is urgent. For example, when the user changes the setting of the UE to stop the MDT measurement, the UE may determine that the transmission of the logged measurement is urgent.

(7) Importance of a Reporting Content

When the logged measurement includes a measurement result of the service cell which is lower than a threshold value, the UE may determine that the transmission of the logged measurement is urgent. When the measurement result of the serving cell is lower than the threshold value, it means a service quality may be problematic, and thus, a prompt notification of this may be needed.

When the logged measurement includes 'out of service,' the UE may determine transmission of the logged measurement is urgent. When the logged measurement includes information that a random camping state has been reached from the idle mode, the UE may determine that the transmission of the logged measurement is urgent. Here, the random camping state is a state in which the UE searches all frequencies of all RATs to find a suitable cell. When the suitable cell is found, the UE enters a normal camping state.

Other than the above (1) to (7), the UE may determine that the reporting of the logged measurement is needed when the logged measurement is a meaningful result for optimizing the network or for other reason. A combination of the criteria of (1) to (7) may be also used.

The MDT configuration may include information about whether to permit transmission of the reporting indicator. If the transmission of the reporting indicator is permitted, the UE may determine whether the reporting of the logged measurement may be needed.

A format of the reporting indicator is described.

When a specific criterion is used, the reporting indicator may be an indicator having one or more bits indicating whether the specific criterion is satisfied.

The reporting indicator may indicate a reason for determining the urgency of the transmission of the logged measurement. For example, the reporting indicator may be a 3 bit indicator which specifies one of the criteria (1) to (5).

Figure 9:
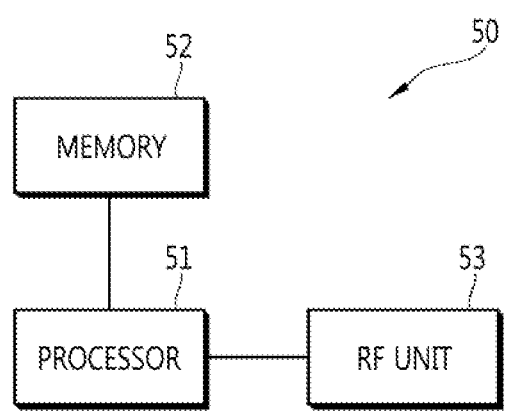
FIG. 9 is a block diagram illustrating a wireless apparatus in which an exemplary embodiment of the present invention is implemented.

FIG. 9 is a block diagram illustrating a wireless apparatus in which an exemplary embodiment of the present invention is implemented. The apparatus implements an operation of the UE in an exemplary embodiment of FIG. 8.

The wireless apparatus 50 includes a processor 51, a memory 52, and a radio frequency unit 53. The processor 51 implements a suggested function, process and/or method. The processor 51 may transit between the RRC connection mode and the RRC idle mode and may measure and report the logged MDT based on the MDT configuration. The memory 52 is connected to the processor 51 to store the MDT configuration and the logged measurement. An exemplary embodiment of FIG. 8 described above may be implemented by the processor 51 and the memory 52.

The RF unit 53 is connected to the processor 51 to transmit and receive a wireless signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for reporting logged measurement in a wireless communication system, the method comprising:
   receiving, by a user equipment, a minimization of drive tests (MDT) configuration from a base station;
   starting a validity timer upon receiving the MDT configuration;

while the validity timer is running, logging, by the user equipment, measurements based on the MDT configuration in order to collect the logged measurements;

determining, by the user equipment, whether a reporting of the logged measurements is needed; and transmitting, by the user equipment, a reporting indicator indicating the reporting of the logged measurements is needed to the base station when it is determined that the reporting of the logged measurements is needed.

2. The method of claim 1, wherein the user equipment logs the measurements in a radio resource control (RRC) idle mode.

3. The method of claim 2, wherein the reporting indicator indicates that the reporting of the logged measurements is urgent.

4. The method of claim 3, wherein the user equipment determines that the reporting of the logged measurements is needed when a remaining amount of a buffer which stores the logged measurements is lower than a threshold.

5. The method of claim 3, wherein the user equipment determines that the reporting of the logged measurements is needed when a battery residue is lower than a threshold.

6. The method of claim 2, further comprising:

receiving, by the user equipment, a reporting request for the logged measurements from the base station after sending the reporting indicator; and transmitting, by the user equipment, a measurement result including the logged measurements to the base station in response to the reporting request.

7. The method of claim 1, wherein the user equipment determines that the reporting of the logged measurements is needed when a time remaining until the validity timer expires is less than a threshold.

8. The method of claim 1, further comprising:

starting a conservation timer when the validity timer expires, wherein the user equipment determines that the reporting of the logged measurements is needed when a time remaining until the conservation timer expires is less than a threshold.

9. A wireless apparatus for reporting logged measurements in a wireless communication system, the wireless apparatus comprising:

a radio frequency (RF) unit configured to transmit and receive a radio signal; and a processor operably connected to the RF unit and configured to:

receive a minimization of drive tests (MDT) configuration from a base station;

start a validity timer upon receiving the MDT configuration;

while the validity timer is running, log measurements based on the MDT configuration in order to collect the logged measurements;

determine whether a reporting of the logged measurements is needed; and transmit a reporting indicator indicating the reporting of the logged measurements is needed to the base station when it is determined that the reporting of the logged measurements is needed.

10. The wireless apparatus of claim 9, wherein the reporting indicator indicates that the reporting of the logged measurements is urgent.

11. The wireless apparatus of claim 9, wherein the processor is configured to determine that the reporting of the logged measurements is needed when a time remaining until the validity timer expires is less than a threshold.

12. The wireless apparatus of claim 9, wherein the processor is configured to determine that the reporting of the logged measurements is needed when a remaining amount of a buffer which stores the logged measurement is lower than a threshold.

13. The wireless apparatus of claim 9, wherein the processor is configured to determine that the reporting of the logged measurements is needed when a battery residue is lower than a threshold.

* * * * *